UNITED STATES PATENT OFFICE.

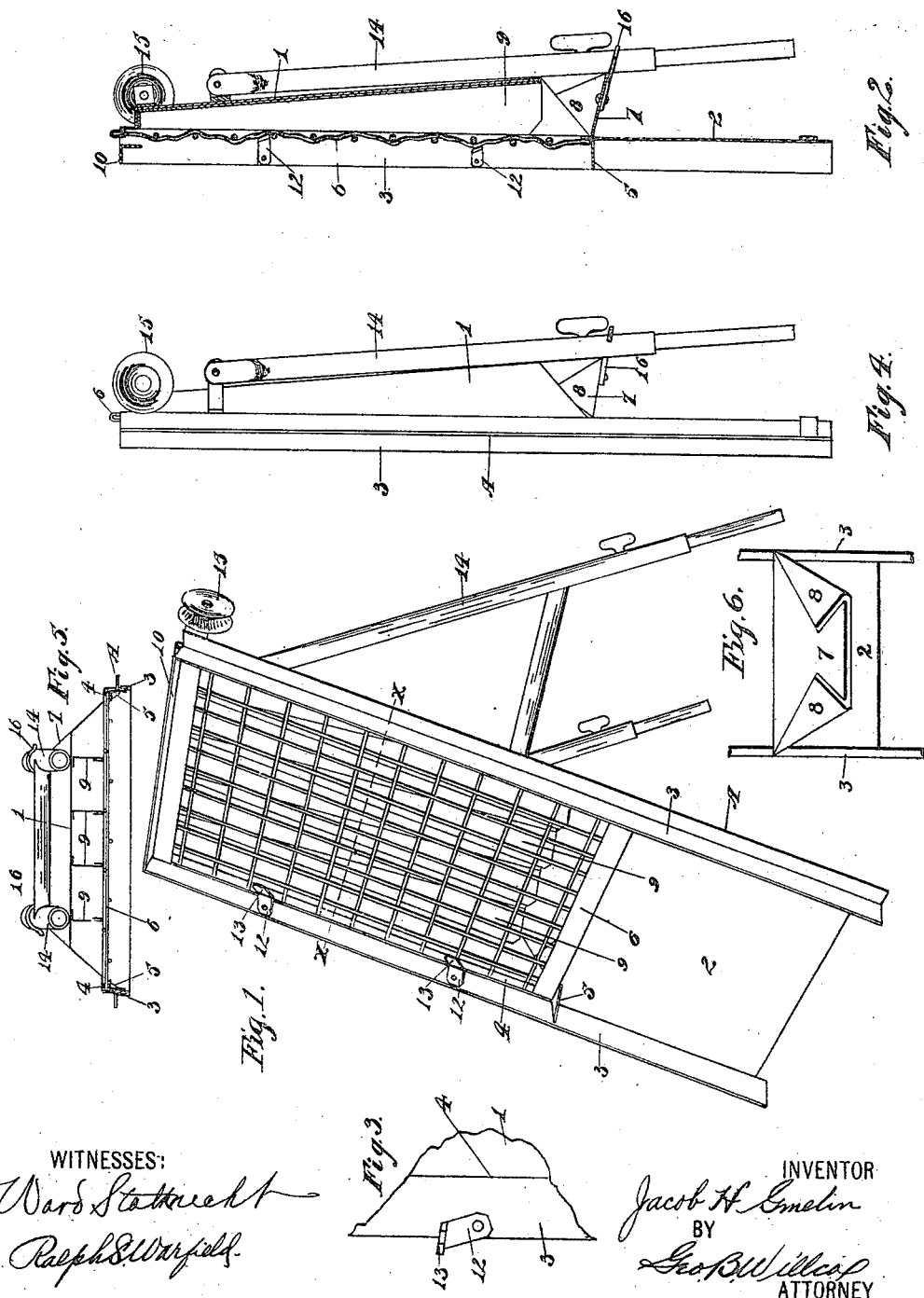

JACOB HENRY GMELIN, OF BAY CITY, MICHIGAN.

SAND AND GRAVEL SCREEN.

964,237.     Specification of Letters Patent.     Patented July 12, 1910.

Application filed January 28, 1909. Serial No. 474,653.

*To all whom it may concern:*

Be it known that I, JACOB HENRY GMELIN, a citizen of the United States, residing at Bay City, in the county of Bay and State of Michigan, have invented certain new and useful Improvements in Sand and Gravel Screens; and I do hereby declare the following to be a full, clear, and exact description of the invention, such as will enable others skilled in the art to which it appertains to make and use the same.

My invention relates to screens and more particularly to sand and gravel screens.

One object is the provision of means for supporting the screen intermediate its edges against sagging. This operates to strengthen the screen and prolong its life.

Another object is the provision of a novel portable screen-supporting frame.

Still another object is the provision of improved means for removably retaining the screens in position and permitting the substitution of screens of finer or coarser mesh.

A further object is the provision of means for catching and shunting the materials passing through the screen into a pile or a suitable container.

To these and other ends, therefore, my invention consists in certain novel features and combinations of parts such as will be more fully described hereinafter and particularly pointed out in the claims.

In the accompanying drawings, Figure 1 is a perspective view of my invention, Fig. 2 is a vertical sectional view, Fig. 3 is a detail view of the releasable locking means for retaining the screens in position, Fig. 4 is a side view of the screen in portable position, Fig. 5 is a cross-sectional view on line $x$—$x$ of Fig. 1, and Fig. 6 is a detail rear view of a portion of the invention illustrating the converging wings 8, 8.

Heretofore a simple screen inclosed within a box-like frame has been used for screening sand or gravel. Such a screen has been propped in an inclined position in any suitable manner and the sand or gravel thrown against the screen. The sand, because of its dampness, frequently clogs the meshes of the screen and it is customary for the operator to strike the screen sharply with his shovel to loosen the sand. This soon cuts the screen and renders it worthless. Furthermore, the screen will soon sag because of the impact of the sand thereagainst, and become concave so that the sand travels down the center of the screen and the entire screen surface is not utilized.

My invention consists of a suitable frame and a removable screen supported therein, associated with other novel features of utility not present in sand and gravel screens of which I am aware. The frame A of the screen, comprises a depressed trough or apron 1, an extension 2 and sides 3, 3.

At the juncture of the side edges of the apron with the sides, are formed ways 4, 4, having abutments 5, 5, projecting across the ways at their lower ends to form rests with which the lower corners of the screen 6 engage. These rests are located at the upper corners of the extensions 2. The sides project upward on each side of and above the apron and the extension also, to confine the material.

The apron is cut away or recessed at its lower edge and a chute 7 projects rearwardly from the upper edge of the extension 2, the opposite sides of such chute being provided with the converging confining wings 8, 8. The ways extend upward substantially in alinement with the plane of the extension 2, but the apron is gradually inclined away from the ways, from its head to its lower edge.

Supporting ribs 9, 9 extend longitudinally of the apron. Such ribs gradually increase in height as they near the bottom of the apron to compensate for the inclination given the apron, so that the plane of the upper edges of the ribs lies approximately in alinement with the plane of the ways 4, 4.

It will be seen that I have provided an apron inclined at a greater angle to the horizontal than is the extension 2. Also it will be noted that the spaces between the ribs form channels which lead the screened material to the chute 7 located beneath and extending backward at an angle to the depressed apron.

At the head of the frame, the upper ends of the sides 3, 3 are connected by a cross brace 10 between which and the upper reduced ends of the ribs 9, 9, is formed a space adapted to receive the screen 6. This space is preferably wide enough to receive screens of varying thickness. The side edges of the screen are slidingly received on the ways 4, 4 and held in place against lateral movement by the sides 3, 3. The lower end of the screen overlaps the upper end of the extension 2 and rests upon the abutments 5, 5. The screen intermediate its edges is supported by the free longitudinal edges of the ribs 9, 9. This is a feature of great importance and prevents the sagging of the screen, thereby increasing and prolonging its utility.

In order to retain the screen against outward movement, I may provide suitable locking means, as the catches 12, pivotally secured to the inner faces of the sides. The locking means may be of any convenient style, the catches shown being angular, whereby the feet 13, when the catches are moved to locked position, engage and lie upon the screen, as shown. These catches are so arranged that they may assume the position shown in Fig. 3, to receive and engage an extra thick screen.

The screen itself is preferably formed of rolled steel wire which is given a sinuous or undulating form. These wires are interlaced to form longitudinally elongated meshes. I find that screens of this form are superior to the common style of screen because the sinuosity of the wires imparts a rolling movement rather than a sliding movement to the material to be screened, thereby causing the fine particles to be quickly loosened from the coarser material. Where the material slides down the screen, a considerable portion of the fine material is carried over the screen on top of the coarser material and does not sift through.

I may provide suitable legs or props 14 hinged to the back of the apron or to the sides, to retain the frame and screen at any desired angle.

Portability is given the screen by providing the wheels 15, 15, journaled at the upper corners of the depressed apron, and in order to render the device compact when transporting the same from place to place, I provide a suitable fastening, as a hook 16, pivotally secured to the under face of the chute 7 and adapted to take over one of the legs 14 to retain the latter snugly in position.

In operation, the sand or gravel is tossed or deposited on the screen near its upper end in the usual manner, the fine particles falling through the meshes of the screen, while the coarser particles roll down off the screen and onto the extension 2. The screened particles falling into the channels between the ribs are conducted to the lower recessed end of the apron and are shunted off onto the chute 7 which may discharge the material into a wheelbarrow or onto the ground as preferred.

In order to transport the screen from place to place, the legs are brought close to the back and the hook caught over at least one of the legs, whereupon the operator can raise the foot of the screen and trundle the device to any desired position on the wheels 15.

Having thus fully disclosed my invention, what I claim as new, is:—

1. A screening device comprising sides and a depressed apron, shoulders formed at the juncture of the sides and apron, catches secured to the sides above the shoulders, a sliding screen removably received and supported on the shoulders and held in place by the catches, abutments at the lower ends of the shoulders projecting at approximate right angles to the sides and extension and located at the juncture thereof, an extension projecting in the same plane with and at the lower end of the screen, the lower end of the apron being offset from the extension, leaving an open space between the head of the extension and the foot of the apron to form a discharge orifice.

2. A portable metallic screen comprising sides, a plate connecting the lower ends of the sides, a depending apron connecting the upper ends of the sides, the apron being gradually inclined from its head to its foot and terminating short of the head of the plate to leave a discharge opening, a chute carried by the head of the plate and extending partially across the opening, a screen removably received between the sides, means on which the lower end of the screen rests when in inclined position, the plate constituting an extension of the screen, and means for retaining the frame at any desired angle.

In testimony whereof, I affix my signature in presence of two witnesses.

JACOB HENRY GMELIN.

Witnesses:
  HARLEY C. ALGER,
  RICHARD SURGESON.